(12) United States Patent
Natali et al.

(10) Patent No.: US 11,247,653 B2
(45) Date of Patent: Feb. 15, 2022

(54) HYDRAULIC CONTROL SYSTEM

(71) Applicant: Dana Motion Systems Italia S.R.L., Reggio Emilia (IT)

(72) Inventors: Fabio Natali, Reggio Emilia (IT); Giovanni Mariech, Reggio Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 0 days.

(21) Appl. No.: 16/970,548

(22) PCT Filed: Feb. 18, 2019

(86) PCT No.: PCT/EP2019/053997
§ 371 (c)(1),
(2) Date: Aug. 17, 2020

(87) PCT Pub. No.: WO2019/162237
PCT Pub. Date: Aug. 29, 2019

(65) Prior Publication Data
US 2021/0107439 A1    Apr. 15, 2021

(30) Foreign Application Priority Data
Feb. 20, 2018 (EP) .................................... 18425010

(51) Int. Cl.
*F15B 11/044* (2006.01)
*B60T 13/66* (2006.01)
*B60T 13/12* (2006.01)

(52) U.S. Cl.
CPC ............ *B60T 13/662* (2013.01); *B60T 13/12* (2013.01); *F15B 11/0445* (2013.01);
(Continued)

(58) Field of Classification Search
CPC ...... F15B 2211/5059; F15B 2211/7058; F15B 2211/715; F16H 61/4157
See application file for complete search history.

(56) References Cited

U.S. PATENT DOCUMENTS

| 4,142,450 A | * | 3/1979 | Thoma | F04B 1/20 91/485 |
| 5,467,598 A | | 11/1995 | Welscher | |

(Continued)

FOREIGN PATENT DOCUMENTS

| EP | 3104022 A1 | 12/2016 |
| JP | 54050741 A * | 4/1979 |

(Continued)

OTHER PUBLICATIONS

ISA European Patent Office, International Search Report Issued in Application No. PCT/EP2019/053997, dated Apr. 17, 2019, WIPO, 3 pages.

*Primary Examiner* — Kenneth Bomberg
*Assistant Examiner* — Matthew Wiblin
(74) *Attorney, Agent, or Firm* — McCoy Russell LLP

(57) ABSTRACT

A hydraulic control system for control of a hydraulic motor. The hydraulic control system comprises a fluid distribution assembly having a tank, a pump to pump fluid from the tank and a directional valve for distributing pressurised fluid from the pump and to return fluid to the tank; a valve assembly fluidly connected to the directional valve, the valve assembly having a first overcenter valve and a pressure reducing valve wherein a first main line connects the directional valve to the first overcenter valve and wherein a shuttle line connects the pressure reducing valve to the first main line; a hydraulic motor fluidly connected to the valve assembly wherein the first main line connects the hydraulic motor to the first overcenter valve; and a brake assembly fluidly connected to the pressure reducing valve, wherein a drain line connects the pressure reducing valve to the hydraulic motor.

19 Claims, 9 Drawing Sheets

(52) U.S. Cl.
CPC ........... *F15B 2211/20546* (2013.01); *F15B 2211/30505* (2013.01); *F15B 2211/7058* (2013.01); *F15B 2211/715* (2013.01)

(56) References Cited

U.S. PATENT DOCUMENTS

| | | | |
|---|---|---|---|
| 6,038,859 A * | 3/2000 | Mangano | E02F 9/123 60/436 |
| 2010/0012200 A1* | 1/2010 | Tretsch | F16K 17/30 137/511 |
| 2018/0180066 A1* | 6/2018 | Rygaard Hansen | F15B 13/0417 |

FOREIGN PATENT DOCUMENTS

| | | |
|---|---|---|
| JP | H01255702 A | 10/1989 |
| JP | H06173905 A | 6/1994 |
| JP | H11139276 A | 5/1999 |
| JP | 2001171985 A | 6/2001 |
| WO | 2015021400 A1 | 2/2015 |

* cited by examiner

HYDRAULIC CONTROL SYSTEM

CROSS-REFERENCE TO RELATED APPLICATIONS

The present application is a U.S. National Phase of International Patent Application No. PCT/EP2019/053997, entitled "HYDRAULIC CONTROL SYSTEM", and filed on Feb. 18, 2019. International Patent Application No. PCT/EP2019/053997 claims priority to European Patent Application No. 18425010.8, filed on Feb. 20, 2018. The entire contents of each of the above-mentioned applications are hereby incorporated by reference in their entirety for all purposes.

TECHNICAL FIELD

This disclosure relates generally to the field of hydraulic control systems; particularly to the field of hydraulic control systems for hydraulic motors; and more particularly to hydraulic control systems for activating hydraulic motors and for activating brake systems coupled directly or indirectly to hydraulic motors.

BACKGROUND AND SUMMARY

Hydraulic control systems rely on pressurisation of fluids and control of flow direction of the pressurised fluids for control of hydraulic actuators such as a hydraulic motor or a hydraulic cylinder. Pressurised fluid is directed by the hydraulic control system to activate the hydraulic actuator.

In a known hydraulic control system, pressurised fluid is sent to a hydraulic motor in order to drive a mechanical device. In certain situations, the hydraulic motor is configured to drive the mechanical device in a first and a second direction. The hydraulic motor may be activated in either direction by the control of flow of the pressurised fluid.

The hydraulic control system may be configured to control a brake system. The brake system may block or release the hydraulic motor. The brake system may block or release an output shaft coupled directly or indirectly to the hydraulic motor. The brake system may be a negative brake which is normally applied when the hydraulic motor is inactive and is not applied when the hydraulic motor is active. The actuation of the brake is controlled through the hydraulic control system.

The present disclosure is directed, at least in part, to improving or overcoming one or more aspects of the prior art system.

The present disclosure describes a hydraulic control system for control of a hydraulic motor. The hydraulic control system comprises a distribution assembly for supplying and receiving fluid, the distribution assembly having a tank, a pump configured to pump fluid from the tank and a directional valve for distributing pressurised fluid from the pump and to return fluid to the tank; a valve assembly fluidly connected to the directional valve, the valve assembly having a first overcenter valve and a pressure reducing valve wherein a first main line connects the directional valve to the first overcenter valve and wherein a shuttle line connects the pressure reducing valve to the first main line; a hydraulic motor fluidly connected to the valve assembly wherein the first main line connects the hydraulic motor to the first overcenter valve; and a brake assembly fluidly connected to the pressure reducing valve, characterised in that a drain line connects the pressure reducing valve to the hydraulic motor.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
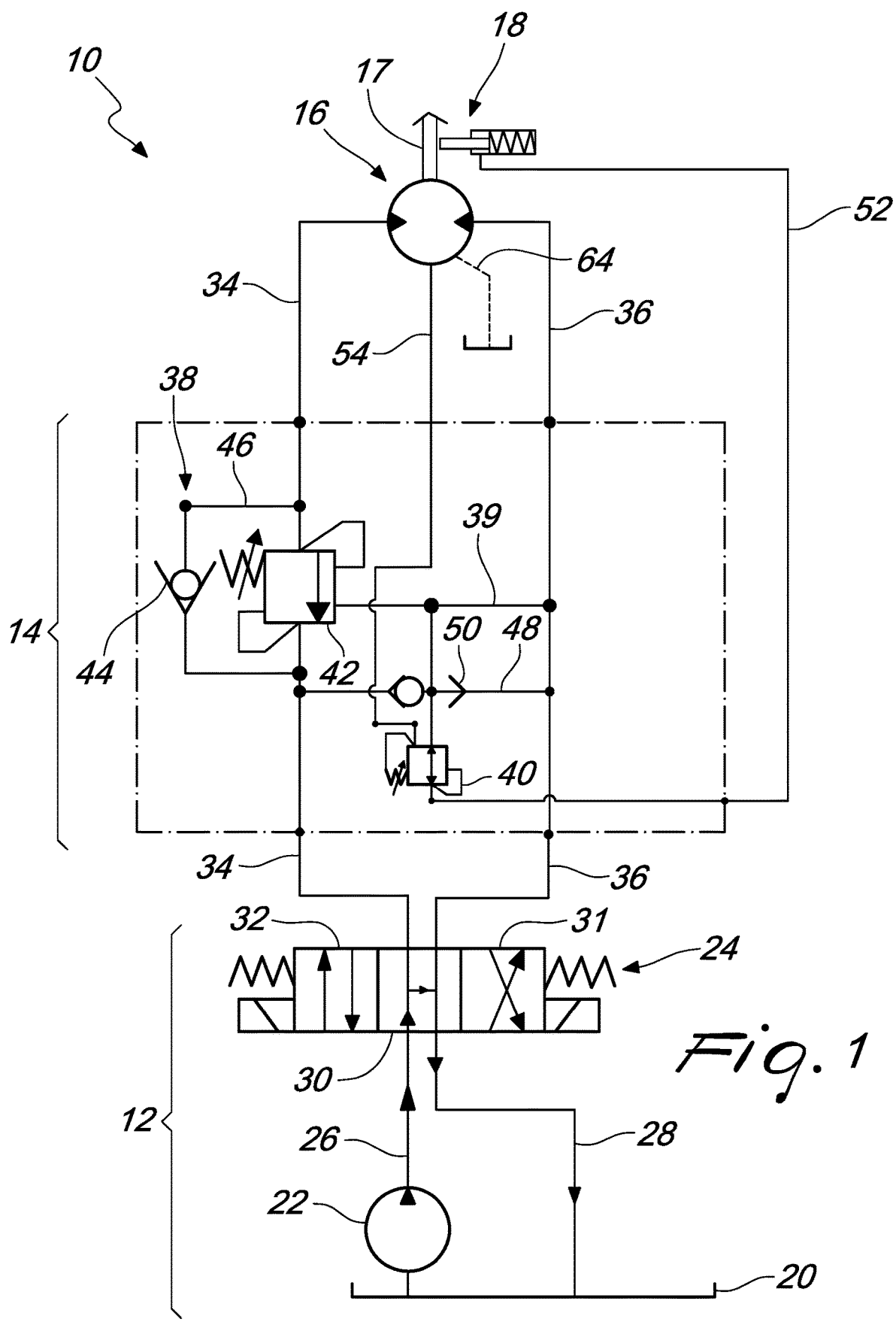
FIG. 1 is a first embodiment of a hydraulic control system in a neutral configuration according to the present disclosure.

This disclosure generally relates to a hydraulic control system. The hydraulic control system controls the distribution of pressurised fluid for operation of a hydraulic motor. The operation of the hydraulic motor involves actuation and braking thereof.

FIGS. 1 to 6 illustrate a hydraulic control system 10. The hydraulic control system 10 comprises a distribution assembly 12, a valve assembly 14, a hydraulic motor 16 and a brake assembly 18. The distribution assembly 12, the valve assembly 14, the hydraulic motor 16 and the brake assembly 18 are mutually connected through fluid lines.

The distribution assembly 12 is configured to supply and receive fluid. The distribution assembly 12 comprises a tank 20. The tank 20 contains fluid for distribution through the hydraulic control system 10. Fluid is sent flowing through the hydraulic control system 10 from the tank 20. Fluid is returned to the tank 20 after flowing through the hydraulic control system 10. In an embodiment, the fluid may be hydraulic oil.

The distribution assembly 12 comprises a pump 22. The pump 22 is configured to pump fluid from the tank 20. Pressurised fluid is sent to the valve assembly 14. An activated pump 22 sends pressurised fluid for operation of the hydraulic motor 16 and the brake assembly 18. Pump 22 may be a unidirectional hydraulic pump. Pump 22 may be a fixed displacement pump.

The distribution assembly 12 comprises a directional valve 24. The directional valve 24 distributes pressurised fluid from the pump 22. Directional valve 24 is configured to receive pressurised fluid from the pump 22 through a first conduit 26. The directional valve 24 is configured to return fluid from the valve assembly 14 to the tank 20. Directional valve 24 is configured to return fluid to the tank 20 through a second conduit 28.

The directional valve 24 is a four-port, three-position valve. The directional valve 24 has a first position 30, a second position 32 and a third position 31. In the first position 30, the directional valve 24 sets the hydraulic controls system to neutral configuration. The directional valve 24 connects the first conduit 26 to the second conduit 28.

In the second position 32, the directional valve 24 sets the hydraulic controls system 10 to a first active configuration. The first conduit 26 is not connected to the second conduit 28. The first conduit 26 and the second conduit 28 are independently fluidly connected to the valve assembly 14.

In the third position 31, the directional valve 24 sets the hydraulic controls system 10 to a second active configuration. The first conduit 26 is not connected to the second conduit 28. The first conduit 26 and the second conduit 28 are independently connected to the valve assembly 14.

The valve assembly 14 is fluidly connected to the distribution assembly 12. The valve assembly 14 is fluidly connected to the directional valve 24. The valve assembly 14 is connected to the distribution assembly 12 through a first main line 34 and a second main line 36. The first main line 34 and the second main line 36 run through the valve assembly 14.

In the first position 30, the directional valve 24 does not connect either the first conduit 26 or the second conduit 28 to the first main line 34 or the second main line 36. In the second position 32, the directional valve 24 connects the first conduit 26 to the first main line 34 and connects the second conduit 28 to second main line 36. In the third position, directional valve 24 connects the first conduit 26 to the second main line 36 and connects the second conduit 28 to first main line 34.

Figure 2:
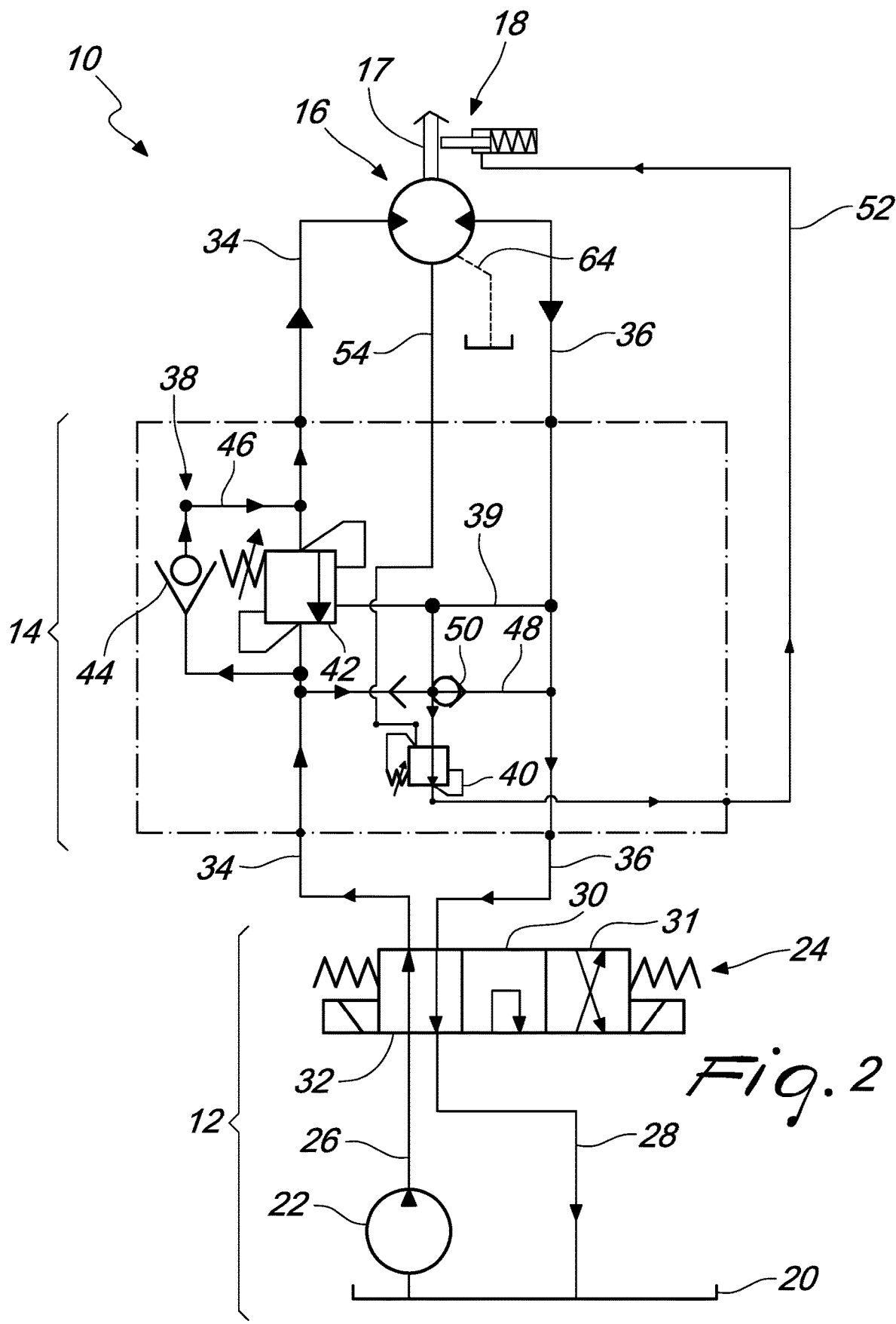
FIG. 2 is a first embodiment of a hydraulic control system in a first active configuration according to the present disclosure.
Figure 3:
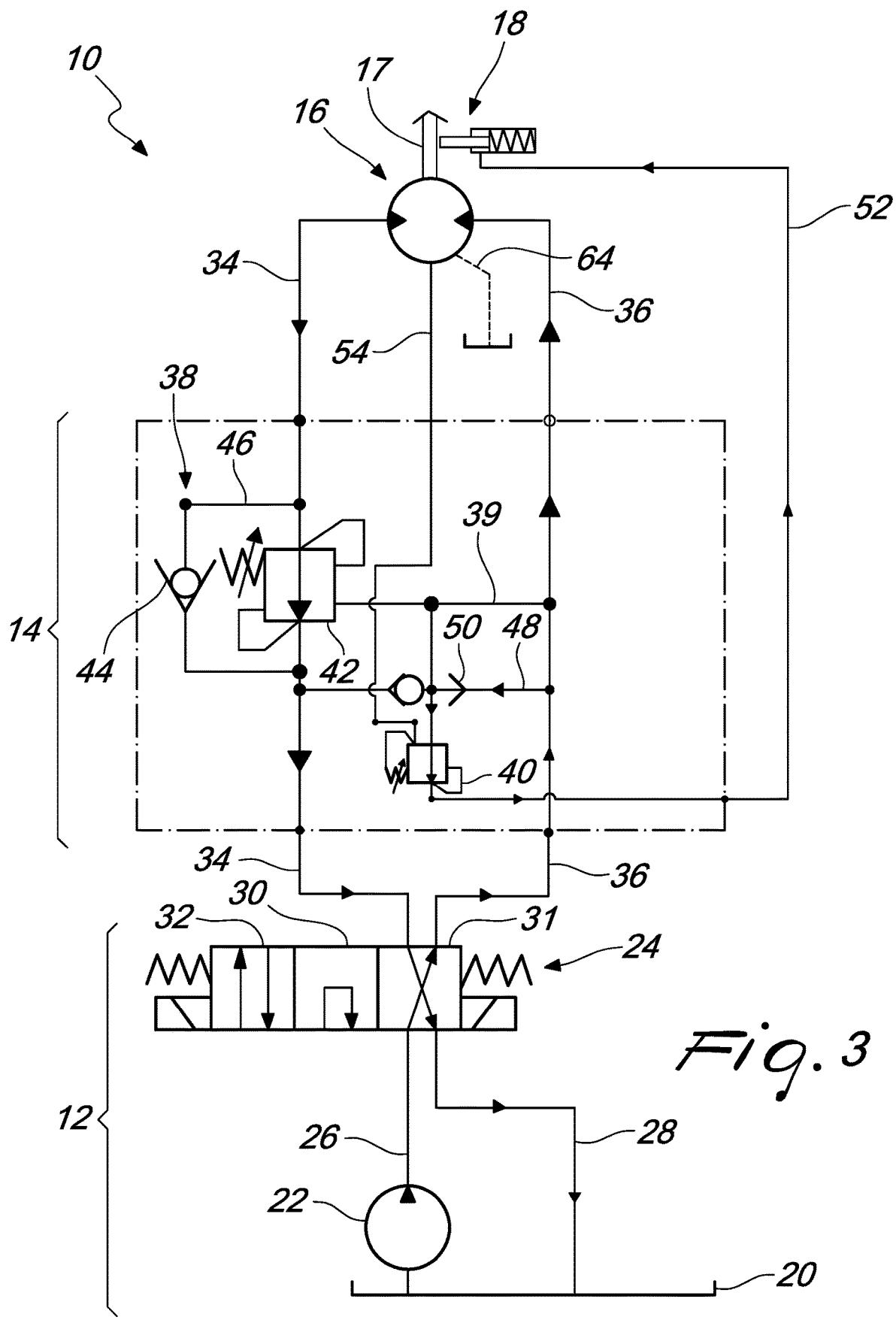
FIG. 3 is a first embodiment of a hydraulic control system in a second active configuration according to the present disclosure.
Figure 4:
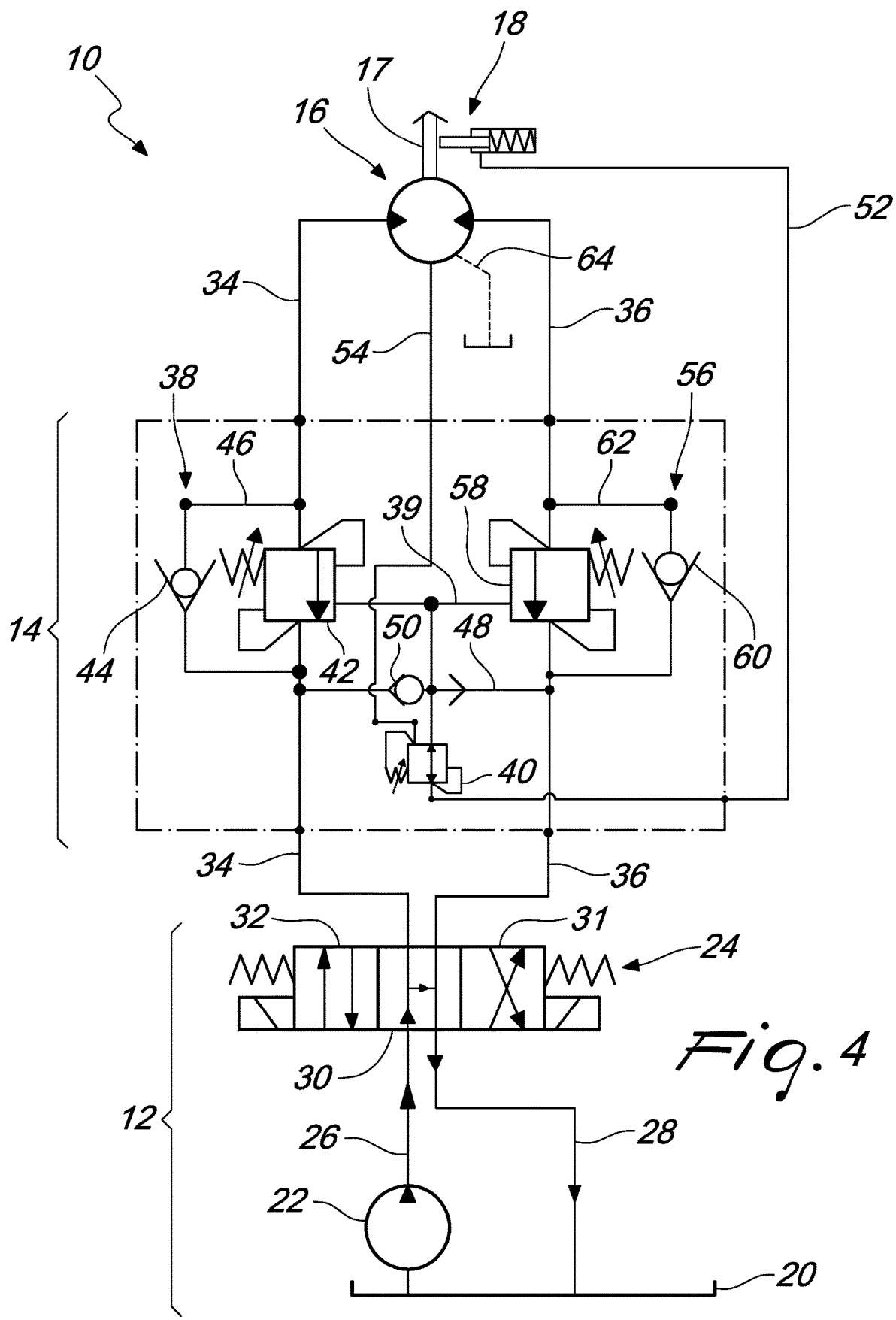
FIG. 4 is a second embodiment of a hydraulic control system in a neutral configuration according to the present disclosure.
Figure 5:
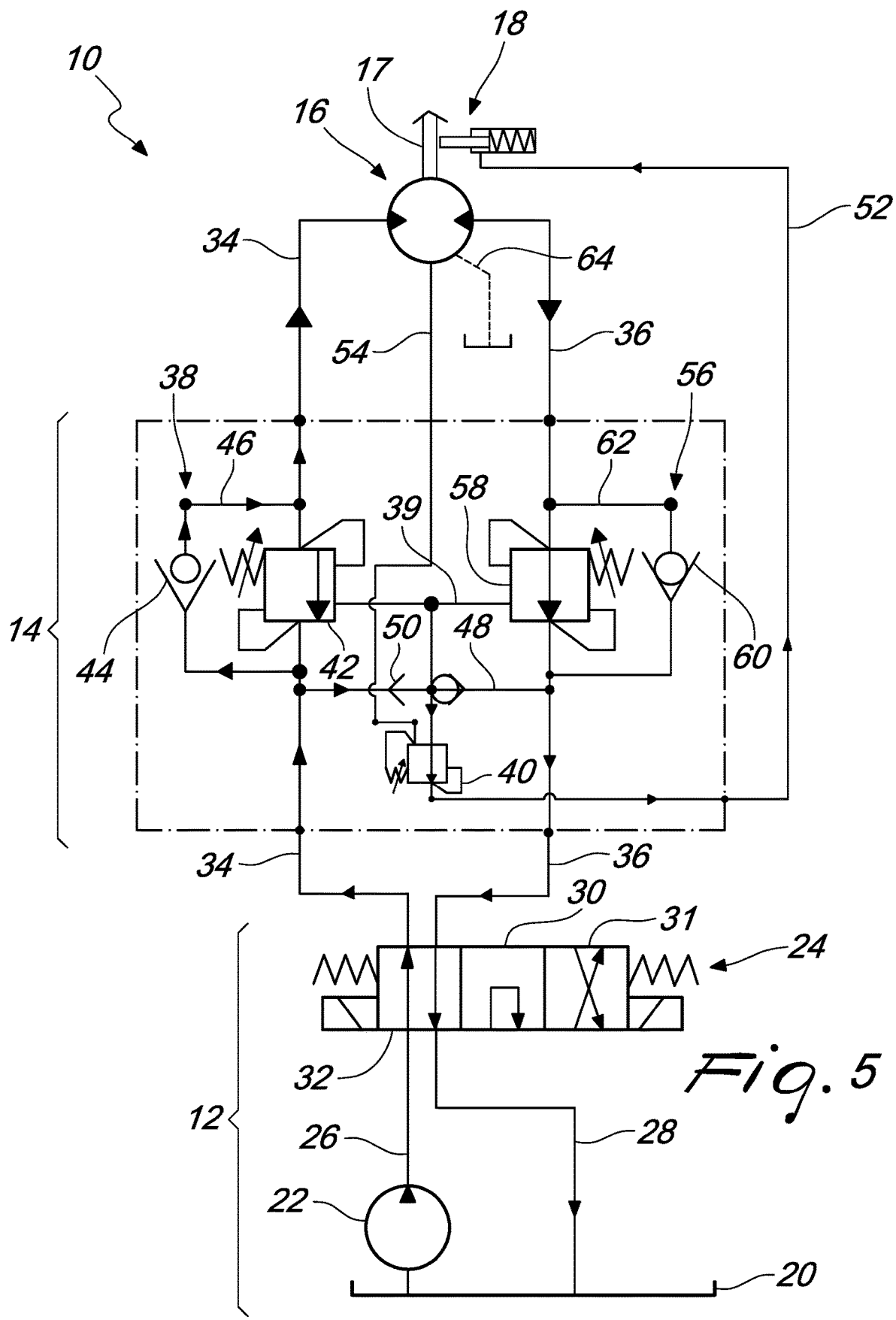
FIG. 5 is a second embodiment of a hydraulic control system in a first active configuration according to the present disclosure.
Figure 6:
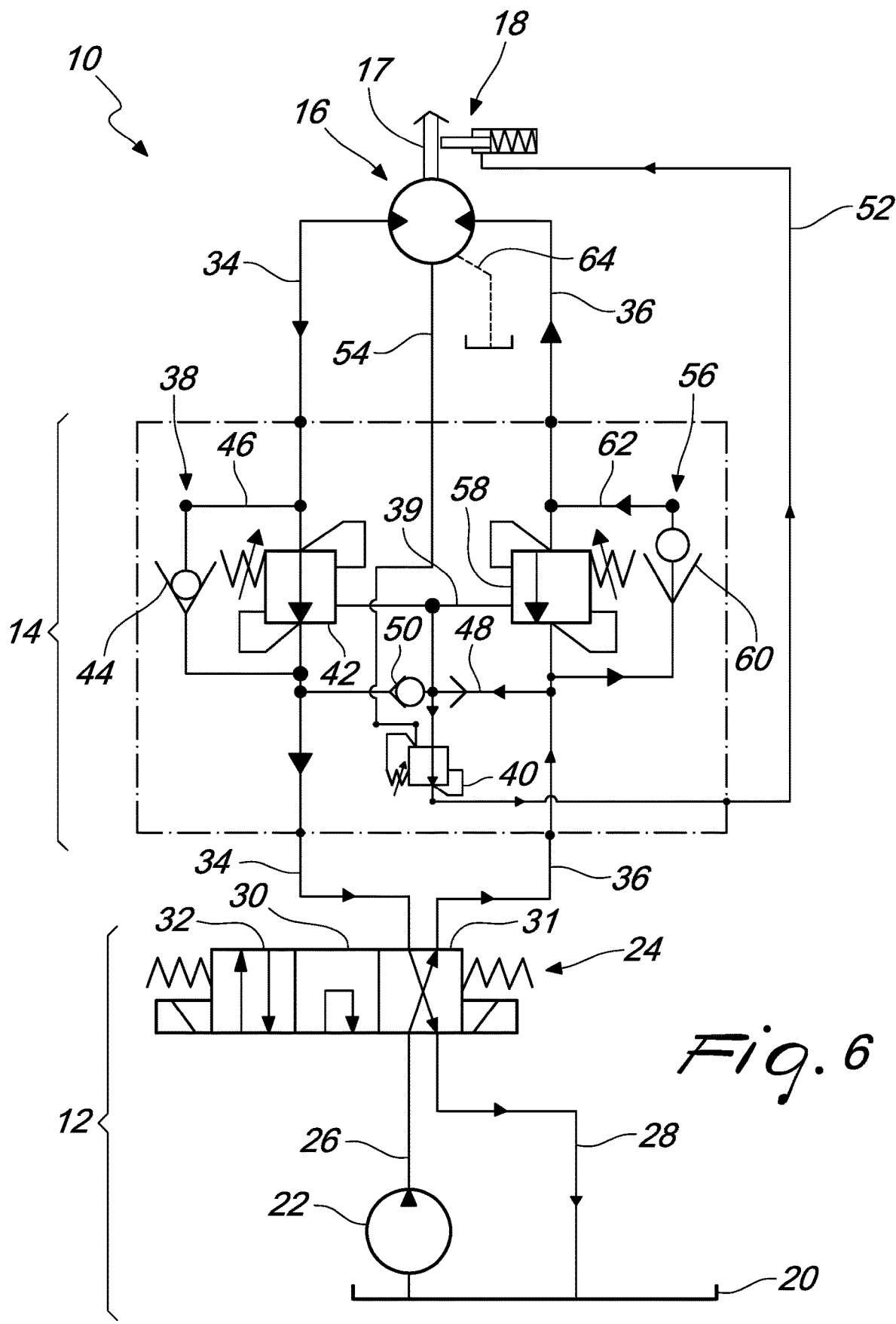
FIG. 6 is a second embodiment of a hydraulic control system in a second active configuration according to the present disclosure.

With reference to FIGS. 1 to 3, in the first embodiment of the hydraulic control system 10, the valve assembly 14 comprises a first overcenter valve 38. With reference to FIGS. 4 to 6, in the second embodiment of the hydraulic control system 10, the valve assembly 14 comprises the first overcenter valve 38 and a second overcenter valve 56.

With reference to FIGS. 1 to 6, the valve assembly 14 comprises the first overcenter valve 38 and a pressure reducing valve 40. The first main line 34 connects the directional valve 24 to the first overcenter valve 38. First overcenter valve 38 comprises a first pilot assisted relief valve 42 and a first check valve 44. The first pilot assisted relief valve 42 is positioned on the first main line 34. A first bypass line 46 connects the first check valve 44 to the first main line 34.

A shuttle line 48 connects the pressure reducing valve 40 to the first main line 34. In an embodiment, a shuttle valve 50 is positioned on the shuttle line 48. The pressure reducing valve 40 is connected to the shuttle line 48 through the shuttle valve 50. In the first embodiment of the hydraulic control system 10, the shuttle line 48 may further connect the pressure reducing valve 40 to the second main line 36. The shuttle line 48 may be connected between the first main line 34 and the second main line 36

The hydraulic motor 16 is fluidly connected to the valve assembly 14. The hydraulic motor 16 is connected to the valve assembly 14 through the first main line 34 and the second main line 36. The hydraulic motor 16 is configured to receive pressurised fluid from the valve assembly 14. The hydraulic motor 16 is configured to return fluid to the valve assembly 14.

The hydraulic motor 16 is fluidly connected to the first overcenter valve 38. The first main line 34 connects the hydraulic motor 16 to the first overcenter valve 38. With reference to FIGS. 1 to 3, in the first embodiment of the hydraulic control system 10, the hydraulic motor 16 is connected directly to the directional valve 24 through the second main line 36. Hydraulic motor 16 is driven by pressurised fluid from the first main line 34 or the second main line 36. Return fluid is discharged through the second main line 36 or the first main line 34.

The hydraulic control system 10 may further comprise a fluid pipe 64 to manage drainage of fluid. In an embodiment, the hydraulic motor 16 may further comprise a fluid pipe 64. In an alternative embodiment, the valve assembly 14 may further comprise the fluid pipe 64.

In an embodiment, the hydraulic motor 16 is configured to rotate in a first direction. In a preferred embodiment, the hydraulic motor 16 is configured to rotate bidirectionally in the first direction and in a second direction. In an embodiment, the hydraulic motor 16 may be a fixed displacement motor. In an alternative embodiment, the hydraulic motor 16 may be a variable displacement motor.

The brake assembly 18 is fluidly connected to the pressure reducing valve 40. The brake assembly 18 is connected to the pressure reducing valve 40 through a brake line 52. Brake assembly 18 comprises a negative brake. Brake assembly 18 is mechanically applied. In an embodiment, brake assembly is applied with a biasing force. In an embodiment, brake assembly 18 is spring applied. In a further embodiment, brake assembly 18 is applied to the hydraulic motor 16. Brake assembly 18 is hydraulically released.

In an embodiment, the brake assembly 18 acts on the hydraulic motor 16. The brake force is applied to the hydraulic motor 16. In an alternate embodiment, the brake assembly 18 acts on an output shaft 17. The brake force is applied to the output shaft 17. The output shaft 17 may be coupled directly or indirectly to the hydraulic motor 16. The hydraulic control system 10 further comprises a drain line 54 connecting the pressure reducing valve 40 to the hydraulic motor 16.

With reference to FIGS. 3 to 6, in the second embodiment of the hydraulic control system 10, the valve assembly 14 further comprises the second overcenter valve 56. The second main line 36 connects the directional valve 24 to the second overcenter valve 56. Second overcenter valve 56 comprises a second pilot assisted relief valve 58 and a second check valve 60. The second pilot assisted relief valve 58 is positioned on the second main line 36. A second bypass line 62 connects the second check valve 60 to the second main line 36.

The shuttle line 48 further connects the pressure reducing valve 40 to the second main line 36. The shuttle line 48 is connected between the first main line 34 and the second main line 36. Shuttle valve 50 is piloted by the pressure of the fluid in either the first main line 34 or the second main line 36.

The hydraulic motor 16 is further fluidly connected to the second overcenter valve 56. The second main line 36 connects the hydraulic motor 16 to the second overcenter valve 56. Hydraulic motor 16 is driven by pressurised fluid from either the first main line 34 or the second main line 36. Return fluid is discharged through either the second main line 36 or the first main line 34.

With reference to FIGS. 1 to 3, in the first embodiment of the hydraulic control system 10, a fluid line 39 connects second fluid line 36 to the first overcenter valve 38. The fluid line 39 assists in the piloting of the first overcenter valve 38. With reference to FIGS. 4 to 6, in the second embodiment of the hydraulic control system 10, the fluid line 39 connects second overcenter valve 56 to the first overcenter valve 38. The fluid line 39 assists in the piloting of the second overcenter valve 56 and the first overcenter valve 38.

With reference to FIGS. 1 and 4, in the first and second embodiments of the hydraulic control system 10, the directional valve 24 is actuated to the first position 30. The hydraulic control system 10 is set to the neutral configuration. In regards to both the first and second embodiment of hydraulic control system 10, pressurised fluid is not sent to the valve assembly 14. Pressurised fluid from the pump 22 is returned to the tank 20. Pressurised fluid is not sent to the hydraulic motor 16 as a result the hydraulic motor 16 is not actuated. Pressurised fluid is not sent to the brake assembly 18 as a result brake assembly 18 is not actuated. Brake assembly 18 is not actuated. The brake force of brake assembly 18 is not released. In an embodiment, brake assembly 18 blocks the rotation of output shaft 17 coupled directly or indirectly to the hydraulic motor 16. In an alternate embodiment, brake assembly 18 directly blocks the rotation of hydraulic motor 16.

With reference to FIGS. 2 and 5, in the first and second embodiments of the hydraulic control system 10, the directional valve 24 is actuated to the second position 32. The hydraulic control system 10 is set to the first active configuration. With respect to the first and second embodiment of the hydraulic control system 10, the first conduit 26 is connected to the first main line 34 and the second conduit 28 is connected to the second main line 36.

Pressurised fluid from the pump 22 is sent to the valve assembly 14. Pressurised fluid flows from the pump 22 to the directional valve 24 through the first conduit 26. Pressurised fluid is supplied to the first main line 34 through the directional valve 24.

Pressurised fluid flows through the first main line 34 to the shuttle line 48. From the shuttle line 48 pressurised fluid flows to the pressure reducing valve 40. In an embodiment, the shuttle valve 50 positioned on the shuttle line 48 is piloted by the pressure signal in the shuttle line 48 from the first main line 34.

Pressurised fluid with a decreased pressure signal is sent from the pressure reducing valve 40 to brake assembly 18. The brake assembly 18 is actuated to release the brake force. The brake assembly 18 is actuated to move against the mechanical biasing force. In an embodiment, with the release of the brake force the output shaft 17 is free to rotate. In an alternate embodiment, with the release of the brake force the hydraulic motor 16 is free to rotate.

Pressurised fluid flows through the first main line 34 to the first overcenter valve 38. The first overcenter valve 38 is configured to enable pressurised fluid to flow through the first bypass line 46. Pressurised fluid does not flow through the first pilot assisted relief valve 42 which remains closed. Pressurised fluid from the first main line 34 flows through the first check valve 44. First check valve 44 opens to permits flow of the pressurised fluid to bypass the first pilot assisted relief valve 42.

Pressurised fluid flows to the hydraulic motor 16 from the first main line 34. Pressurised fluid actuates the hydraulic motor 16 to rotate in the first direction. Return fluid from the hydraulic motor 16 flows into the second main line 36.

With reference to FIG. 2, in the first embodiment of the hydraulic control system 10, return fluid from the hydraulic motor 16 flows through the second main line 36 directly to the directional valve 24. Return fluid from the hydraulic motor 16 flows to the valve assembly 14 flows through the second main line 36 to the directional valve 24. Return fluid is sent to the tank 20 from the directional valve 24 through second conduit 28.

With reference to FIG. 5, in the second embodiment of the hydraulic control system 10, return fluid from the hydraulic motor 16 flows through the second main line 36 and the second overcenter valve 56 to the directional valve 24. The second pilot assisted relief valve 58 is piloted to open so as to permit passage of the return fluid through the second main line 36. The second check valve 60 remains closed and does not permit flow of the return fluid through the second bypass line 62. Return fluid from the second overcenter valve 56 flows to the directional valve 24. Return fluid is sent to the tank 20 from the directional valve 24 through second conduit 28.

With reference to FIGS. 3 and 6 and in the first and second embodiments of the hydraulic control system 10, the directional valve 24 is actuated to the third position 31. The hydraulic control system 10 is set to the second active configuration. The first conduit 26 is connected to the second main line 36 and the second conduit 28 is connected to the first main line 34.

Pressurised fluid from the pump 22 is sent to the valve assembly 14. Pressurised fluid flows from the pump 22 to the directional valve 24 through the first conduit 26. Pressurised fluid is supplied to the second main line 36 through the directional valve 24.

Pressurised fluid flows through the second main line 36 to the shuttle line 48. From the shuttle line 48 pressurised fluid flows to the pressure reducing valve 40. In an embodiment, the shuttle valve 50 positioned on the shuttle line 48 is piloted by the pressure signal in the shuttle line 48 from the second main line 36.

Pressurised fluid with a decreased pressure signal is sent from the pressure reducing valve 40 to brake assembly 18. The brake assembly 18 is actuated to release the brake force. The brake assembly 18 is actuated to move against the mechanical biasing force. With the release of the brake force the hydraulic motor 16 is free to rotate.

With reference to FIG. 3, in the first embodiment of the hydraulic control system 10, pressurised fluid flows through the second main line 36 directly to the hydraulic motor 16.

With reference to FIG. 6, in the second embodiment of the hydraulic control system 10, pressurised fluid flows through the second main line 36 to the second overcenter valve 56. The second overcenter valve 56 is configured to enable pressurised fluid to flow through the second bypass line 62. Pressurised fluid does not flow through the second pilot assisted relief valve 58 which remains closed. Pressurised fluid from the second main line 36 flows through the second check valve 60. Second check valve 60 opens to permits flow of the pressurised fluid to bypass the second pilot assisted relief valve 58.

With reference to FIGS. 3 and 6, in the first and second embodiments of the hydraulic control system 10, pressurised fluid flows to the hydraulic motor 16 from the second main line 36. Pressurised fluid actuates the hydraulic motor 16 to rotate in the second direction. Return fluid from the hydraulic motor 16 flows into the first main line 34.

Return fluid from the hydraulic motor 16 flows through the first main line 34 and the first overcenter valve 38 to the directional valve 24. The first pilot assisted relief valve 42 is piloted to open so as to permit passage of the return fluid through the first main line 34. The first check valve 44 remains closed and does not permit flow of the return fluid through the first bypass line 46. Return fluid from the first overcenter valve 38 flows to the directional valve 24. Return fluid is sent to the tank 20 from the directional valve 24 through second conduit 28.

With reference to FIGS. 2 to 3 and 4 to 6, in the first and second embodiments of the hydraulic control system 10, fluid from the hydraulic motor 16 may drain into the fluid pipe 64. Fluid from the pressure reducing valve 40 may drain into the drain line 54. The flow of fluid into the drain line 54 is managed by a single fluid pipe 64.

Figure 7:
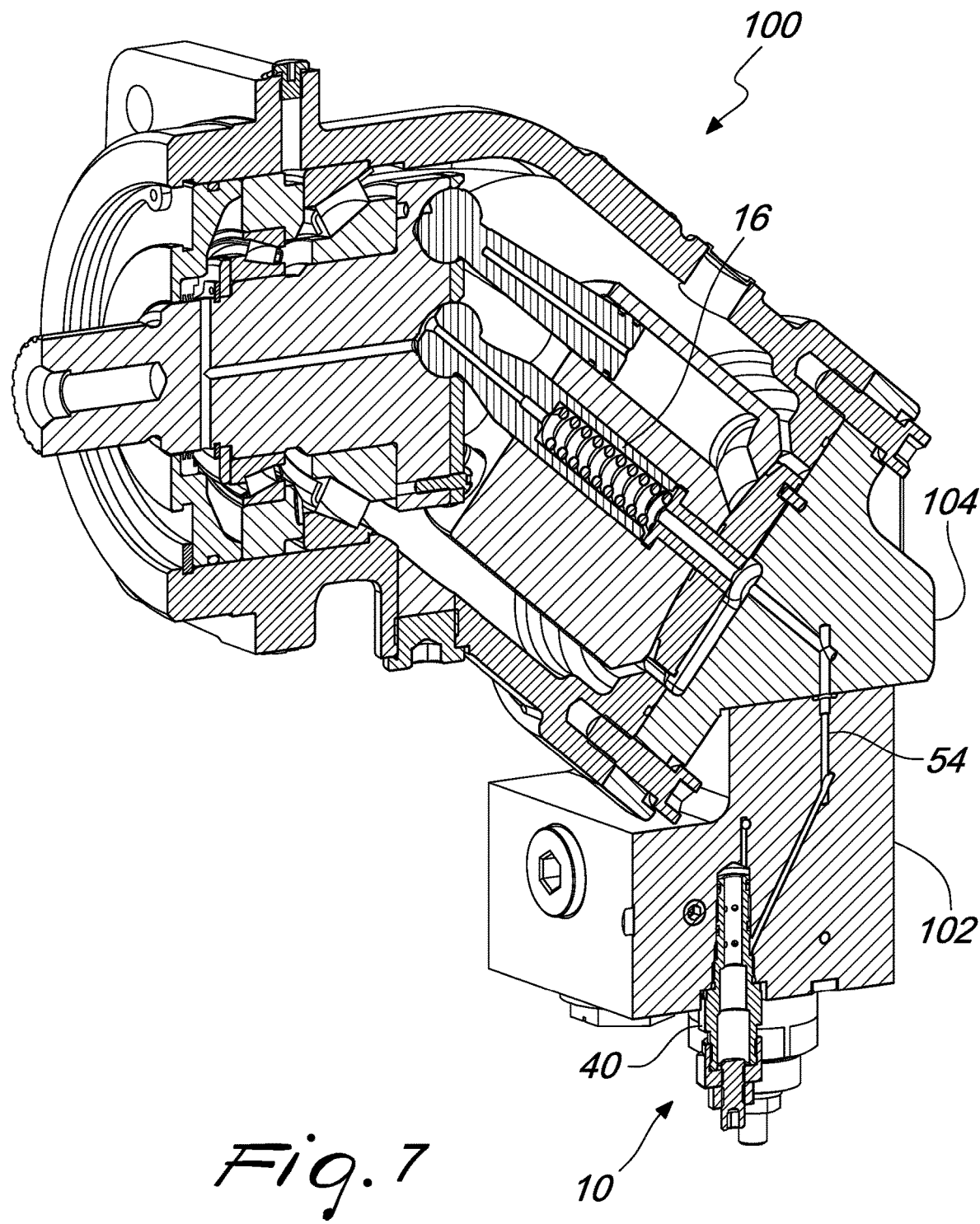
FIG. 7 is a first embodiment of a hydraulic device having the hydraulic control system according to the present disclosure.
Figure 8:
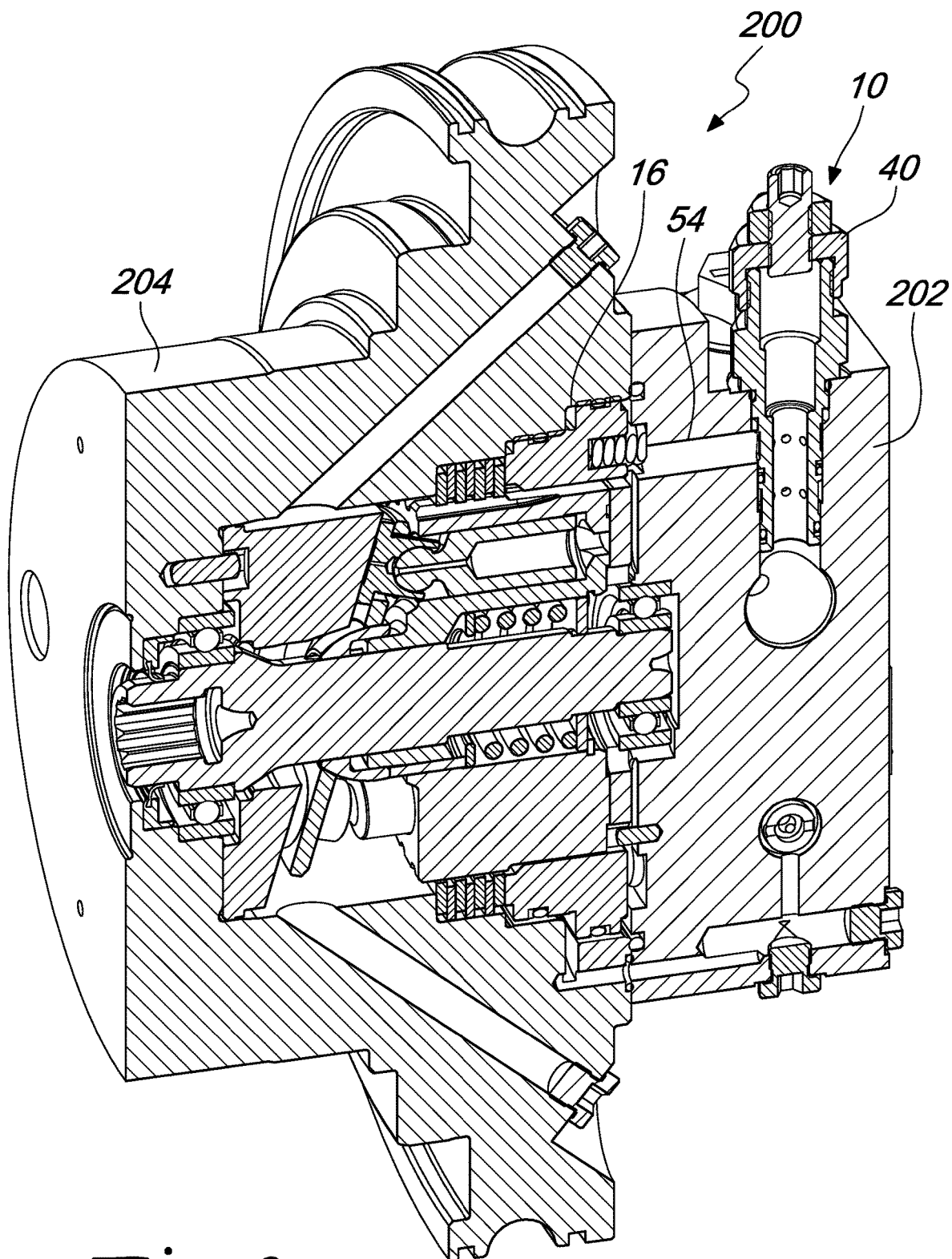
FIG. 8 is a second embodiment of a hydraulic device having the hydraulic control system according to the present disclosure.
Figure 9:
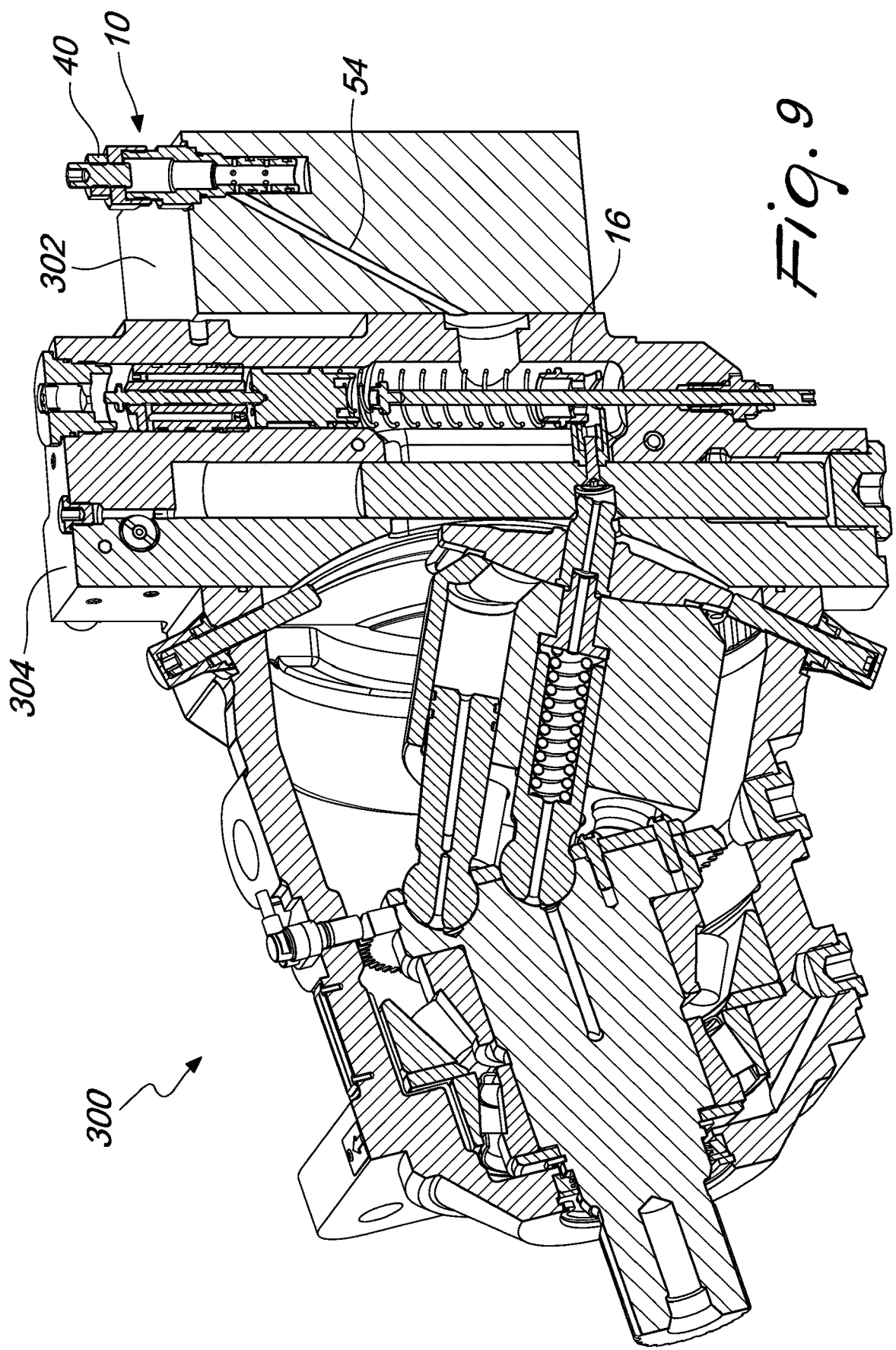
FIG. 9 is a third embodiment of a hydraulic device having the hydraulic control system according to the present disclosure.

With reference to FIGS. 7 to 9, a hydraulic device 100, 200, 300 comprises the hydraulic control system 10. With reference to FIG. 7, the hydraulic device 100 is a bent axis fixed displacement piston motor wherein the drain line 54 extends from the valve block 102 into the housing 104. With reference to FIG. 8, the hydraulic device 200 is a swash plate wherein the drain line 54 extends from the valve block 202 into the housing 204. With reference to FIG. 9, the hydraulic device 300 is a bent axis variable displacement piston motor wherein the drain line 54 extends from the valve block 302 into the housing 304.

With reference to FIGS. 7 to 9, in an embodiment, the drain line 54 connects between the pressure reducing valve 40 and the head of the hydraulic motor 16 through the valve block 102, 202, 302 and the housing 104, 204, 304. In an alternate embodiment, the drain line 54 connects between the pressure reducing valve 40 and the head of the hydraulic motor 16 external to the valve block 102, 202, 302 and the housing 104, 204, 304 through an external tube (not shown).

The skilled person would appreciate that foregoing embodiments may be modified or combined to obtain the hydraulic control system 10 of the present disclosure.

This disclosure describes a hydraulic control system 10 having a drain line that connects between the pressure reducing valve 40 and the hydraulic motor 16. The hydraulic control system 10 may be employed in a hydraulic device 100. The hydraulic control system 10 enables actuation and braking of the hydraulic device 100. The pressure supplied to actuate the hydraulic motor 16 is substantially the same as the pressure sent to the pressure reducing valve 40. The pressure reducing valve 40 reduces the pressure signal sent to the brake assembly 18 for actuation thereof.

The drain line is shared between by both the pressure reducing valve and the motor so that separates drain lines for the pressure reducing valve and the motor are not required. The common drain line further ensures low pressure in the brake chamber in order to enable longer operation of the brake oil seal which is subjected to a reduced pressure.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A hydraulic control system comprising:
   a distribution assembly for supplying and receiving fluid, the distribution assembly having a tank, a pump configured to pump fluid from the tank and a directional valve for distributing pressurised fluid from the pump and to return fluid to the tank;
   a valve assembly fluidly connected to the directional valve, the valve assembly having a first overcenter valve and a pressure reducing valve, wherein a first main line connects the directional valve to the first overcenter valve, and wherein a shuttle line connects the pressure reducing valve to the first main line;
   a hydraulic motor fluidly connected to the valve assembly, wherein the first main line connects the hydraulic motor to the first overcenter valve;
   a brake assembly fluidly connected to the pressure reducing valve; and
   a drain line connecting an outlet of the pressure reducing valve to the hydraulic motor,
   wherein flow of fluid into the drain line is managed by a fluid pipe connected to the hydraulic motor.

2. The hydraulic control system of claim 1, wherein the distribution assembly has a first conduit and a second conduit and the directional valve has a first and a second position, wherein the directional valve connects the first conduit to the second conduit in the first position and wherein the directional valve connects the first conduit to the first main line and the second conduit to a second main line in the second position, and wherein fluid flows to the pressure reducing valve via the first main line.

3. The hydraulic control system of claim 2, wherein the directional valve has a third position and wherein the directional valve connects the first conduit to the second main line and second conduit to the first main line in the third position.

4. The hydraulic control system of claim 3, wherein a shuttle valve positioned on the shuttle line connects the pressure reducing valve to the shuttle line.

5. The hydraulic control system of claim 1, wherein the directional valve has a third position and wherein the directional valve connects a first conduit to a second main line and second conduit to the first main line in the third position, and wherein fluid flows to the pressure reducing valve via the second main line.

6. The hydraulic control system of claim 5, wherein a shuttle valve positioned on the shuttle line connects the pressure reducing valve to the shuttle line.

7. The hydraulic control system of claim 1, wherein a shuttle valve positioned on the shuttle line connects the pressure reducing valve to the shuttle line.

8. The hydraulic control system of claim 1, wherein the valve assembly further comprises a second overcenter valve and wherein a second main line connects the directional valve to the second overcenter valve.

9. The hydraulic control system of claim 8, wherein the shuttle line connects the pressure reducing valve to the second main line.

10. The hydraulic control system of claim 8, wherein the hydraulic motor is fluidly connected to the second overcenter valve and wherein the second main line connects the hydraulic motor to the second overcenter valve.

11. The hydraulic control system of claim 1, wherein the drain line connects between the outlet of the pressure reducing valve and a head of the hydraulic motor.

12. A hydraulic device comprising the hydraulic control system of claim 1.

13. The hydraulic device of claim 12, wherein the hydraulic motor is a bent axis fixed displacement piston motor, wherein the drain line extends from a valve block into a housing.

14. The hydraulic device of claim 12, wherein the hydraulic motor is a swash plate type motor, wherein the drain line extends from a valve block into a housing.

15. The hydraulic device of claim 12, wherein the hydraulic motor is a bent axis variable displacement piston motor, wherein the drain line extends from a valve block into a housing of the motor.

16. A hydraulic device having a hydraulic control system, the hydraulic control system comprising:
- a distribution assembly for supplying and receiving fluid, the distribution assembly having a tank, a pump configured to pump fluid from the tank and a directional valve for distributing pressurised fluid from the pump and to return fluid to the tank;
- a valve assembly fluidly connected to the directional valve, the valve assembly having a first overcenter valve and a pressure reducing valve, wherein a first main line connects the directional valve to the first overcenter valve, and wherein a shuttle line connects the pressure reducing valve to the first main line;
- a hydraulic motor fluidly connected to the valve assembly, wherein the first main line connects the hydraulic motor to the first overcenter valve;
- a brake assembly fluidly connected to the pressure reducing valve; and
- a drain line connecting an outlet of the pressure reducing valve to the hydraulic motor, wherein the distribution assembly has a first conduit and a second conduit and the directional valve has a first and a second position, wherein the directional valve connects the first conduit to the second conduit in the first position, and wherein the directional valve connects the first conduit to the first main line and the second conduit to a second main line in the second position, wherein the directional valve has a third position and wherein the directional valve connects the first conduit to the second main line and the second conduit to the first main line in the third position, wherein a shuttle valve positioned on the shuttle line connects the pressure reducing valve to the shuttle line, and wherein flow of fluid into the drain line is managed by a fluid pipe connected to the hydraulic motor.

17. The hydraulic device of claim 16, wherein the hydraulic motor is a bent axis fixed displacement piston motor, wherein the drain line extends from a valve block into a housing.

18. The hydraulic device of claim 16, wherein the hydraulic motor is a swash plate type motor, wherein the drain line extends from a valve block into the housing of the motor.

19. The hydraulic device of claim 16, wherein the hydraulic motor is a bent axis variable displacement piston motor, wherein the drain line extends from a valve block into a housing of the motor.

* * * * *